United States Patent [19]
Paver, Jr.

[11] Patent Number: 6,099,948
[45] Date of Patent: Aug. 8, 2000

[54] ENCAPSULATION OF PRE-EXPANDED ELASTOMERIC FOAM WITH A THERMOPLASTIC

[75] Inventor: Stephen J. Paver, Jr., Troy, Mich.

[73] Assignee: Henkel Corporation, Gulph Mills, Pa.

[21] Appl. No.: 09/071,009

[22] Filed: May 1, 1998

Related U.S. Application Data

[60] Provisional application No. 60/046,864, May 8, 1997.

[51] Int. Cl.[7] .............................. B29C 67/00; B29D 7/00; B32B 3/14; B32B 3/08
[52] U.S. Cl. ...................... 428/304.4; 428/71; 428/192; 428/304.4; 264/45.2; 264/45.9; 264/46.1; 264/46.6; 277/651; 277/652; 277/654
[58] Field of Search ................ 428/71, 192, 304.4; 264/45.2, 45.9, 46.6; 277/651, 652, 654

[56] References Cited

U.S. PATENT DOCUMENTS

| | | |
|---|---|---|
| 4,269,890 | 5/1981 | Breitling et al. ................ 428/320 |
| 4,519,964 | 5/1985 | Rosen . |
| 4,525,316 | 6/1985 | Galla et al. . |
| 4,973,438 | 11/1990 | Gaudreau . |
| 4,980,214 | 12/1990 | Charriere ................................ 428/68 |
| 5,049,591 | 9/1991 | Hayashi et al. . |
| 5,085,814 | 2/1992 | Kamiyama et al. . |
| 5,292,190 | 3/1994 | Lautensenschlaeger et al. ... 312/330.1 |
| 5,476,618 | 12/1995 | Ito et al. . |
| 5,575,871 | 11/1996 | Ryoshi et al. . |
| 5,593,623 | 1/1997 | Mohss . |
| 5,610,207 | 3/1997 | De Simone et al. . |

Primary Examiner—Jerry D. Johnson
Attorney, Agent, or Firm—Wayne C. Jaeschke; Stephen D. Harper

[57] ABSTRACT

A capsule is formed from a pre-expanded foam core in a compressed condition with a thermoplastic outer covering completely enveloping the foam core to maintain it in the compressed condition. The outer covering is made of a material capable of softening sufficiently when heated to permit the foam core to expand toward its original expanded uncompressed condition. Preferably, the outer covering adheres to the foam and then is carried by the expanding foam into intimate contact with the inner surface of a hollow structural member so as to form a seal for the hollow structural member.

17 Claims, 2 Drawing Sheets

ENCAPSULATION OF PRE-EXPANDED ELASTOMERIC FOAM WITH A THERMOPLASTIC

CROSS REFERENCE TO RELATED APPLICATION

This application is based upon provisional application Ser. No. 60/046,864 filed May 8, 1997.

BACKGROUND OF THE INVENTION

It is often desirable to fill the cavity sections of assemblies with low density materials to obtain acoustic damping, structural reinforcement or sealing.

Various expandable foam materials are known in the art. For instance, it is known to have a foam filled article comprising a polymeric outer shell and a foam core. It is prepared by compressing expandable material in a degradable container, then forming a shell while degrading the container. The foam may be expandable urethane, the degradable (e.g., by heat) container, a polyethylene bag and the shell, a vinyl polymer. When the container degrades during the forming of the shell, the unconstrained foam expands to fill the molded article. The need for the degradable bag, however, is time and cost ineffective and the degraded material is unwanted and perhaps otherwise detrimental.

It is also known to have a heat insulating material utilizing a core of polyurethane foam within a gas barrier material. Because of its deformability it is said that it can be used to insulate an irregular surface for excellent thermal insulation.

It is further known to have an expansion molded article comprising a porous sheet of a heat-resistant polymer which is bonded to a mold, in which are contained prefoamed particles to be uniformly heated.

Also known are various fillers for cavities including pillars and other automobile frame hollow structures used in the automotive industry. Typical filler materials are one- and two-part epoxies and polyurethanes that expand upon heating due to chemical reaction or chemical decomposition of a blowing agent. However, polyurethanes contain toxic isocyanates and many epoxy curing agents are allergic sensitizers, which require at least minimum handling precautions involving gloves and ventilation.

There exists, then, a need for a filler material which is efficiently and inexpensively capable of filling and bonding to the internal area of a cavity, and which works on a physical, rather than a chemical mechanism.

BRIEF SUMMARY OF THE INVENTION

The invention in one embodiment relates to a two-part capsule structure comprising an outer covering about a foam core, the core being of a pre-expanded foam capable of expansion upon heating and the cover optionally being capable of adhesion to an adjacent surface. The cover preferably adheres to and seals the hollow structural member being filled.

In another embodiment the invention relates to a method of filling an enclosed space or cavity comprising inserting a two-part capsule into a space and heating to melt the outer covering and permit the foam to expand. The heat activation causes the encapsulated foam to expand, and the coating to soften or melt and be carried by the expanded foam to form an airtight seal against the surface of the enclosed space.

In a third embodiment the invention relates to a process for making such capsules comprising compressing a pre-expanded foam core; providing an outer thermoplastic coating about the core; and sealing the coating or covering about the core.

The fourth embodiment of the invention relates to a hollow structural member having its cavity filled and sealed by the activated capsule.

The invention is useful in a number of applications, including providing automotive and other types of manufacturing (e.g. aircraft, ships, cycles, etc.) with the ability to accurately fill body sections with acoustical or structural foam, utilizing minimal amounts of material, for scaling and baffling purposes.

THE DRAWINGS

DETAILED DESCRIPTION

Figure 1:
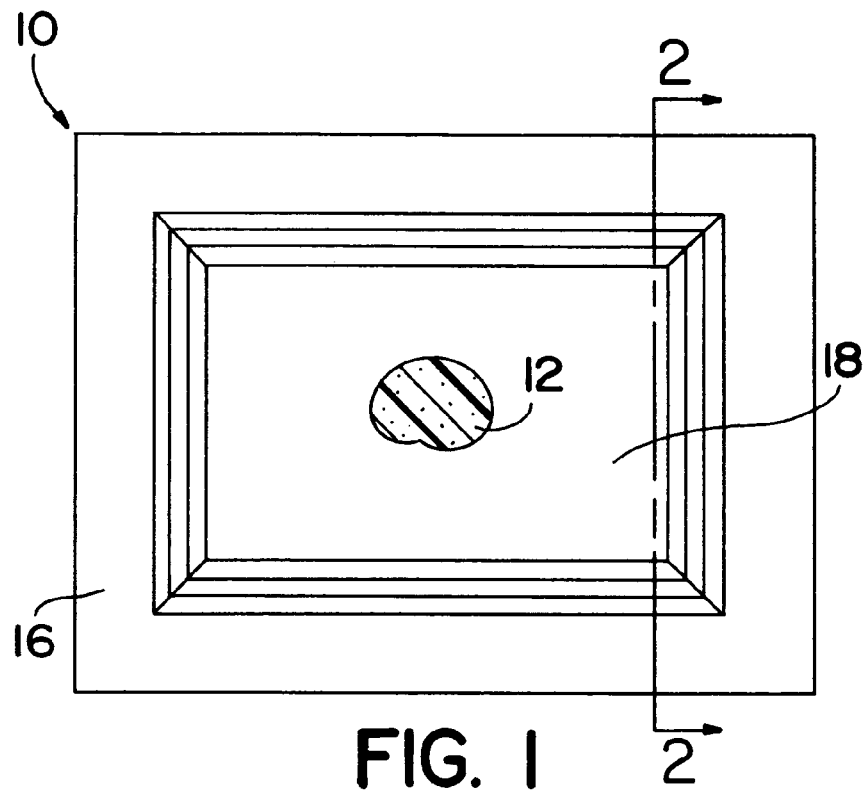
FIG. 1 is a front elevational view partly broken away of a capsule made in accordance with this invention.
Figure 2:
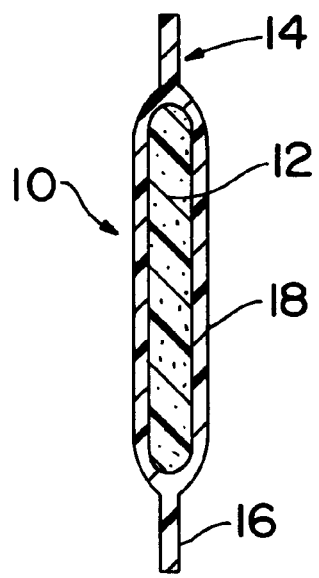
FIG. 2 is a cross-sectional view taken through FIG. 1 along the line 2—2.
Figure 3:
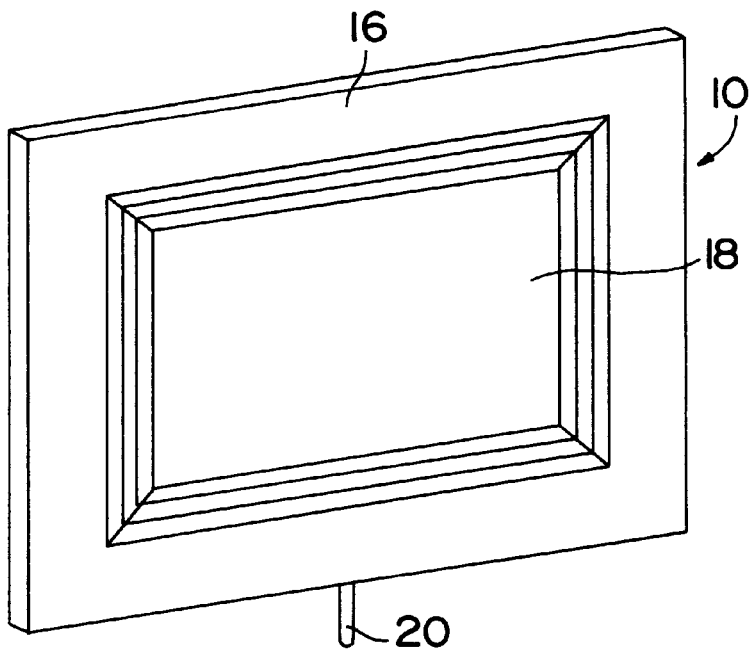
FIG. 3 is a perspective view of the capsule shown in FIGS. 1–2 with a retainer member mounted to the capsule.

The present invention in general involves a capsule 10 shown in FIGS. 1–2 which includes a compressed pre-expanded foam core 12 sandwiched or enveloped between the layers of an outer covering 14 made of a thermoplastic material. In the embodiment illustrated in the drawings, the capsule 10 is formed by co-extruding the compressed foam core 12 and the outer covering 14 so as to result in the foam core being located between two sheets of thermoplastic material. The sheets are sealed along their marginal edges 16 to completely envelope the foam core 12. In this manner the foam core 12 is maintained in its compressed condition and thus is prevented from prematurely returning toward its original shape.

The foam core 12 and the outer covering 14 may be of any suitable size and geometric shape in accordance with the intended end use. For example, if the capsule 10 is intended to fill an elongated cavity in a hollow structural member, the foam core 12 and outer covering 14 might have a corresponding geometry. Similarly, if the cavity is of any other type of shape, including having irregularities in its shape, the capsule could be made to generally conform to that specific shape, thereby facilitating and assuring that when the foam expands, the cavity will be filled.

Sufficient outer covering material is used to provide, as later described, a sealing layer which adheres to and covers the inner surface of the hollow structural member. Preferably, the other covering material also adheres to the foam core so that when the foam core expands, the foam core acts as a carrier to assure that the melted outer covering material will move outwardly during expansion of the foam core and make intimate contact with the inner surface of the hollow structural member, thereby also assuring the sealing function of the outer covering material.

As best shown in FIG. 2, there is more outer covering material along the peripheral margin 16 than along the central portion or sides 18 of the outer covering 14. This extra material also assures that there will be sufficient outer covering material to form a proper seal.

If desired, a retention member 20, such as a push-pin, could be mechanically inserted into and thus become part of the capsule 10. Retention member 20 would function to fit in a corresponding hole in the structural member thereby assuring proper positioning of the capsule 10 in the structural member.

Figure 4:
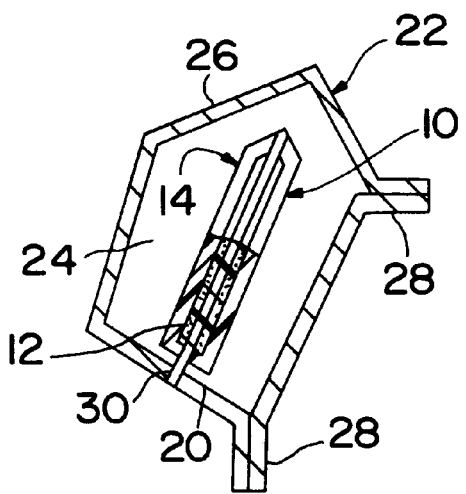
FIG. 4 is a cross-sectional view in elevation showing a capsule partly broken away within the cavity of a hollow structural member before activation of the capsule.
Figure 5:
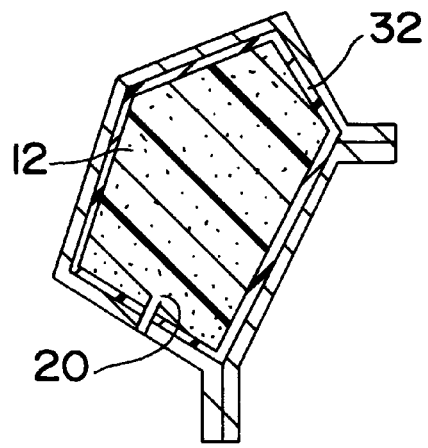
FIG. 5 is a view similar to FIG. 4 after activation of the capsule.

FIGS. 4–5 illustrate one use of the capsule 10. As shown therein, a windshield pillar 22 having a cavity 24 is to be filled by the capsule 10. FIGS. 4–5 show the pillar 22 to include an outer metal structure 26 having flanges 28. Retention pin 20 is inserted into hole 30 of pillar 22. As shown in FIG. 4, the capsule 10 is in its initial unexpanded condition. For example, capsule 10 would be inserted into cavity 24 prior to the e-cat dip. When pillar 22 is later heated, in the e-coat dip, the outer covering 14 begins to soften and melt, and softens sufficiently so that it no longer confines or restrains foam core 12. Foam core 12 is then permitted to expand carrying the melted outer covering material with it until cavity 24 is completely filled as shown in FIG. 5. FIG. 5 also illustrates a sealing layer 32 adhered to and formed completely against the inner surface of pillar 22 to seal the cavity 24. Layer 32 is formed by material 14. As shown foam 12 is also adhered to layer 32 thereby completely filling the cavity.

Any suitable materials may be used for practicing the invention. In selecting these materials, the outer covering should have a melting or softening temperature no greater than the temperature at which the structural member would be heated. Conversely, the foam material should not melt or degrade at that temperature, but rather should have a higher melting point. Thus, for example, where capsule 10 is used in connection with an automotive part which undergoes an e-coating, materials must be selected to accommodate the time and temperature conditions to which the capsule will be subjected. Conventionally, an e-coating takes place at a temperature of 375° F. for a period of about 30 minutes. Accordingly, when capsule 10 is used for an e-coating, the outer covering 14 must soften sufficiently at a temperature no higher than 375° to no longer confine the foam 12, and the foam material 12 must not melt at a temperature of 375°.

An advantage of the present invention is that the foam material could be any suitable foam such as scrap polyurethane which has low compression set possessing a decomposition/melting temperature greater than that of the outer covering. Preferably the foam core is made of a thermosetting material, examples of which are polyurethane, rubber and silicon foams. More preferably, the foam core is polyurethane foam of varying density, e.g. 1, 2, or 3 pound density foam, either virgin or recycled because of its ability to accept the heat typically used in the automotive industry. Foam core 12 is capable of being compressed so that when permitted to expand, its expansion will be at a ratio of from 2–20 compression:expansion. For example, a foam core compressed to ¼ inch thickness, might expand to 1 inch thickness. The particular foam material is not critical, what is important, is that the foam be capable of being compressed and then maintained in its compressed state while within the outer covering and then be able to expand toward its original uncompressed state. The foam core should adhere to and carry the outer covering material 14 so as to assure placement of the outer covering material against the inner surface of the polystructural member.

The foam core material is preferably substantially completely foamed before application of the coating or outer covering 14 so that further reaction within the formed capsule 10 is minimized. Closed or open cell varieties may be used. Foams of high durometer may be specified when it is desired to maximize structural reinforcement. Foams may also be selected for their acoustic dampening or vibration dampening properties. An advantage of the invention is that the pre-expanded thickness and shape of the foam can be tailored to the thickness and shape of the intended cavity to insure that there is no excess squeeze-out which minimizes post-expansion clean-up. The size of the piece of foam is smaller in its X-Y dimensions than is the outer covering.

The outer covering 14 may be made of any suitable material. Preferably, the outer covering is a thermoplastic which may have a low modulus when the objective is sealing or acoustic dampening. In such case, poly(ethylene-co-vinylacetate) is a suitable material. If structural reinforcement is desired, a high modulus, high-strength thermoplastic such as polycarbonate could be used. The melting point of the outer covering 14 should be lower than that of the foam core 12 so that on heating, the covering 14 will soften or melt, but the core foam 12 will not. The outer covering 14 preferably adheres both to the foam core 12 and to the inner surface of the structural member. In a preferred practice of the invention, the outer covering material completely covers the inner sure so as to form a complete seal, although the invention may be practiced without taking advantage of that sealing feature. The outer covering material need not be a material which degrades. It is sufficient that it softens or melts to a degree whereby it no longer restrains the foam 12 from expanding toward its original condition.

As noted, any suitable materials may be used for outer covering 14. A rubber-plastic blend, including about 5–30% and generally about 20% of an elastomeric component such as ethylene vinyl acetate (EVA) or polyvinyl chloride (PVC) may be used. The former is preferred, because of its lesser expense and its favorable environmental properties. One or more thermoplastic materials such as thermoplastic rubber may be blended with the elastomer. The choice of such material would be determined by what substrate it is intended to adhere to. Although the invention may be practiced for use in any hollow structural member, made of any material, including plastic, a preferred practice of the invention is with a metal structural member, particularly metals used in the automotive industry. As noted, FIGS. 4–5 illustrate use of the invention with an A pillar (windshield). Other members such as a B pillar (automotive door) or as an upper fender support may also be used as the hollow structural member. It is to be understood, however, that the invention is not limited to automotive parts, but could be incorporated in any application wherein it is desired to essentially fill a cavity with or without providing a sealing layer on the inner surface of the hollow structural member. The invention could be practiced for filling a structural member of anything that takes energy to move, such as aircrafts, ships, cycles. In its broad practice the structural member can be anything (movable or not) which is benefited by having a foam fill its cavity.

Any suitable process may be used for making the capsule 10. A preferred practice is to co-extrude the foam and its coating, followed by sealing the dye; preparing a bag-type structure about the foam, and heat sealing; then utilizing a dip tank, in which a semi-liquid outer covering is applied in the tank with a series of rollers used to press the coating in place while cooling. The preferred process for making capsules is generally to compress the foam core 12 and subsequently or simultaneously, to co-extrude the outer covering 14. A hot pattern press makes a sheet of connected capsules which could be subsequently cut or cut into individual capsules. Fastening or retainer members such as push-pin 20 could be attached to the capsule to the inside of an assembly cavity. Such retainer members could also be screws, weld studs, rivets and the like, which may be co-molded or co-extruded at this point. The fastening members such as double-backed tape may also be subsequently provided.

FIGS. 1–2 illustrate in full scale one practice of the invention wherein capsule 10 is about 2.3 to about 2.9 inches with a maximum thickness at its center of about 0.28 inches. Marginal edge 16 is about 0.1 inch thick and extends about 0.3 inches outwardly of foam core 12. Outer covering 14 is about 0.05 inches thick at central portion 18. Foam core 12 is about 1.7 by 2.2 inches with a maximum thickness of about 0.2 inches.

In general, the invention may be practiced for filling the cavity of a hollow structural member by loosely placing or precisely positioning such as through the use as retainer members, at least one capsule inside a cavity and then heat-activating the capsule to the softening or melting temperature of the outer covering 14. Any suitable heat activation temperature may be used. Generally, but not necessarily, such temperature might be in the range of about 250° C., to about 400° C. and preferably at least 350° C. An advantage of the invention is that the blend comprising the outer coating 14 will melt and cure and the foam will expand at those temperatures which advantageously are employed down-line in the automotive processing such as e-coating or paint cure, thereby eliminating the need for a separate bake step. The temperature chosen for activation of the capsule is one which much be above the softening point, and preferably above the melting point of the outer covering material, but below the melting point and preferably also below the thermoset of the foam core.

As noted, the invention may be practiced with capsules of various geometric shapes such as flat or two-geometrical shapes, including but not limited to circles and other curvilinear shapes, rectangles and other rectilinear shapes, hexagons and other polygons and the like. The capsule may also have a irregular geometry which generally conforms to the geometry or shape of the cavity in which it is to be placed.

What is claimed is:

1. A capsule for filling a hollow substrate comprising a pre-expanded foam core, said foam core being in a compressed condition, a thermoplastic outer covering completely enveloping said foam core and maintaining said foam core in said compressed condition in a sealed chamber within said outer covering, said outer covering being made of a material which melts at a lower temperature than said foam core, said covering being made of a material which adheres to said foam cover upon melting, said outer covering permitting said foam core to return toward its expanded condition to fill the hollow space upon sufficient softening of said outer covering by the application of heat, and said outer covering including a peripheral margin providing more material of said outer covering around the peripheral edges of said foam core then along the intermediate sides to provide sufficient outer covering material to bond to said foam core and form a sealing layer upon melting of said covering.

2. The capsule of claim 1, including a retainer member secured to said outer covering.

3. The capsule of claim 1, wherein said foam core is made of vibration dampening material.

4. The capsule of claim 1, wherein said foam core is made of acoustical dampening material.

5. In combination, a structural member having a cavity, a capsule in said cavity, said capsule comprising a foam core and an outer covering, said foam core being pre-expanded and in a compressed condition, said foam core in its expanded condition having a volume at least as great as the volume of said cavity, said outer covering completely enveloping said foam core and maintaining said foam core in said compressed condition within a sealed chamber formed by said outer covering, said outer covering made of a thermoplastic material which melts at a lower temperature than said foam core, said outer covering being capable of softening sufficiently upon the application of heat to release said foam core and permit said foam core to return toward its expanded condition to fill said cavity, and said outer covering being made of a material having sufficient quantity to be capable of bonding to said structural member and forming a sealing layer around the inner surface of said structural member at said cavity.

6. The combination of claim 5, wherein said outer covering is bonded to said foam core when said foam core is in its expanded condition.

7. The combination of claim 6, wherein said outer covering includes a peripheral margin providing more material of said outer covering around the peripheral edges of said foam core than along the intermediate sides.

8. The combination of claim 7, including a retainer member secured to said capsule, and said retainer member being mounted to said structural member in said cavity.

9. The combination of claim 8, wherein said structural member is an automotive pillar.

10. The combination of claim 9, wherein said foam core is made of a vibration dampening material.

11. The foam core of claim 9, wherein said foam core is made of an acoustical dampening material.

12. A method of forming a capsule for filling a hollow substrate comprising providing a pre-expanded foam core, compressing the pre-expanded foam core to result in the foam core being in a compressed condition, co-extruding a thermoplastic outer covering around the compressed pre-expanded foam core to envelope the compressed foam core in a sealed chamber within the outer covering, and selecting a material as the outer covering which has a lower melting point that the foam core so that the foam core can return toward its expanded condition upon the melting of the outer covering.

13. The method of claim 12, including securing a retainer member to the capsule.

14. The method of claim 12, wherein the method is used for filling a cavity in a hollow structural member by placing the capsule in the hollow cavity, heating the structural member to heat the capsule and soften the outer covering, expanding the foam core upon the softening of the outer covering to carry the material of the outer covering into intimate contact with the inner surface of the hollow structural member and forming a seal by the melted outer covering material against the inner surface of the hollow structural member.

15. The method of claim 14, including completely filling the cavity with the expanded foam core.

16. The method of claim 14, wherein the structure member is an automotive part, and the heating results from e-coating the automotive part.

17. A capsule made by the method of claim 12.

* * * * *

UNITED STATES PATENT AND TRADEMARK OFFICE
CERTIFICATE OF CORRECTION

PATENT NO.   : 6,099,948
DATED        : August 8, 2000
INVENTOR(S)  : Paver, Jr.

It is certified that error appears in the above-identified patent and that said Letters Patent is hereby corrected as shown below:

<u>Column 5,</u>
Line 49, after "foam", delete "cover", and insert therefor -- core --.

Signed and Sealed this

Tenth Day of June, 2003

JAMES E. ROGAN
*Director of the United States Patent and Trademark Office*